United States Patent
Zigan et al.

(10) Patent No.: US 7,523,616 B2
(45) Date of Patent: Apr. 28, 2009

(54) METHODS AND APPARATUSES FOR ASSEMBLING A GAS TURBINE ENGINE

(75) Inventors: David Christopher Zigan, West Chester, OH (US); Brian C. Brougher, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 11/289,964

(22) Filed: Nov. 30, 2005

(65) Prior Publication Data
US 2007/0119180 A1    May 31, 2007

(51) Int. Cl.
F02C 7/20    (2006.01)

(52) U.S. Cl. .......................................... 60/796; 60/799

(58) Field of Classification Search .................. 60/796, 60/798, 800, 797, 799, 752; 415/136, 138, 415/139, 209.2, 209.4, 189, 190
See application file for complete search history.

(56) References Cited

U.S. PATENT DOCUMENTS

| | | | |
|---|---|---|---|
| 4,078,812 A * | 3/1978 | Beckershoff ................. 277/543 |
| 4,614,082 A | 9/1986 | Sterman et al. |
| 5,180,281 A * | 1/1993 | Burge et al. ............... 415/209.2 |
| 5,211,541 A | 5/1993 | Fledderjohn et al. |
| 5,224,825 A * | 7/1993 | Strang et al. ............. 415/209.3 |
| 5,483,792 A | 1/1996 | Czachor et al. |
| 5,524,430 A | 6/1996 | Mazeaud et al. |
| 5,622,475 A | 4/1997 | Hayner et al. |
| 5,634,767 A | 6/1997 | Dawson |
| 6,382,905 B1 * | 5/2002 | Czachor et al. ................ 415/9 |
| 6,397,603 B1 * | 6/2002 | Edmondson et al. ........... 60/753 |
| 6,401,447 B1 * | 6/2002 | Rice et al. ...................... 60/796 |
| 6,449,952 B1 * | 9/2002 | Emilianowicz et al. ....... 60/772 |
| 6,752,591 B2 | 6/2004 | Hain |
| 6,895,757 B2 * | 5/2005 | Mitchell et al. ................ 60/772 |
| 6,895,761 B2 | 5/2005 | Mitchell et al. |
| 6,904,757 B2 * | 6/2005 | Mitchell et al. ................ 60/800 |
| 6,935,836 B2 * | 8/2005 | Ress et al. ................ 415/173.2 |
| 6,951,112 B2 | 10/2005 | Czachor |

(Continued)

FOREIGN PATENT DOCUMENTS

EP    1431664 A2    6/2004

(Continued)

OTHER PUBLICATIONS

Search Report; Reference No. 137226/11973; Application No. 06124887.8-2315; Place of Search Munich; Dated Mar. 13, 2007; 6 pgs.

*Primary Examiner*—William H Rodríguez
(74) *Attorney, Agent, or Firm*—William Scott Andes, Esq.; Armstrong Teasdale LLP (57) ABSTRACT

A method for assembling a gas turbine engine includes coupling an axisymmetric structure within the gas turbine engine, wherein the axisymmetric structure includes a plurality of mounting bushings extending from a radially outer surface of the axisymmetric structure, inserting a first quantity of fixed pins at least partially into a respective mounting bushing to facilitate securing the axisymmetric structure within the gas turbine engine, and inserting a second quantity of floating pins at least partially into a respective mounting bushing to facilitate each floating pin moving in both an axial and tangential direction with respect to a gas turbine engine centerline axis.

18 Claims, 8 Drawing Sheets

U.S. PATENT DOCUMENTS

| | | |
|---|---|---|
| 6,988,369 B2 * | 1/2006 | Conete et al. ............... 60/796 |
| 7,290,982 B2 * | 11/2007 | Girard et al. ............ 415/173.4 |
| 2002/0184890 A1 * | 12/2002 | Camy et al. ............... 60/796 |
| 2003/0021689 A1 | 1/2003 | Hain |
| 2003/0185674 A1 | 10/2003 | Alford et al. |
| 2004/0118127 A1 * | 6/2004 | Mitchell et al. ............ 60/796 |
| 2004/0250548 A1 * | 12/2004 | Howell et al. ............... 60/796 |

FOREIGN PATENT DOCUMENTS

| | | |
|---|---|---|
| GB | 2263733 A | 8/1993 |
| WO | 0212680 A1 | 2/2002 |

* cited by examiner

METHODS AND APPARATUSES FOR ASSEMBLING A GAS TURBINE ENGINE

BACKGROUND OF THE INVENTION

This invention relates generally to gas turbine engines, and more particularly to methods and apparatus for assembling gas turbine engines.

At least some known gas turbine engines include axisymmetric structures, such as combustors for example. During operation, thermal differentials between the axisymmetric structures and the segmented flowpath components may result in thermal stresses being induced between the axisymmetric structures and the segmented flowpath components. Although providing for relative radial movement between the segmented flowpath components and the axisymmetric structures may facilitate reducing such thermal stresses, such arrangements make it more difficult to maintain at least some of the axisymmetric hardware substantially concentric to the engine centerline axis to facilitate proper operation of the gas turbine engine. Moreover, thermal differentials between the axisymmetric structures and the segmented flowpath components may result in excessive loads on the axisymmetric structures resulting in relatively high cyclic stress and/or fatigue cracks in the axisymmetric structures.

Figure 1:
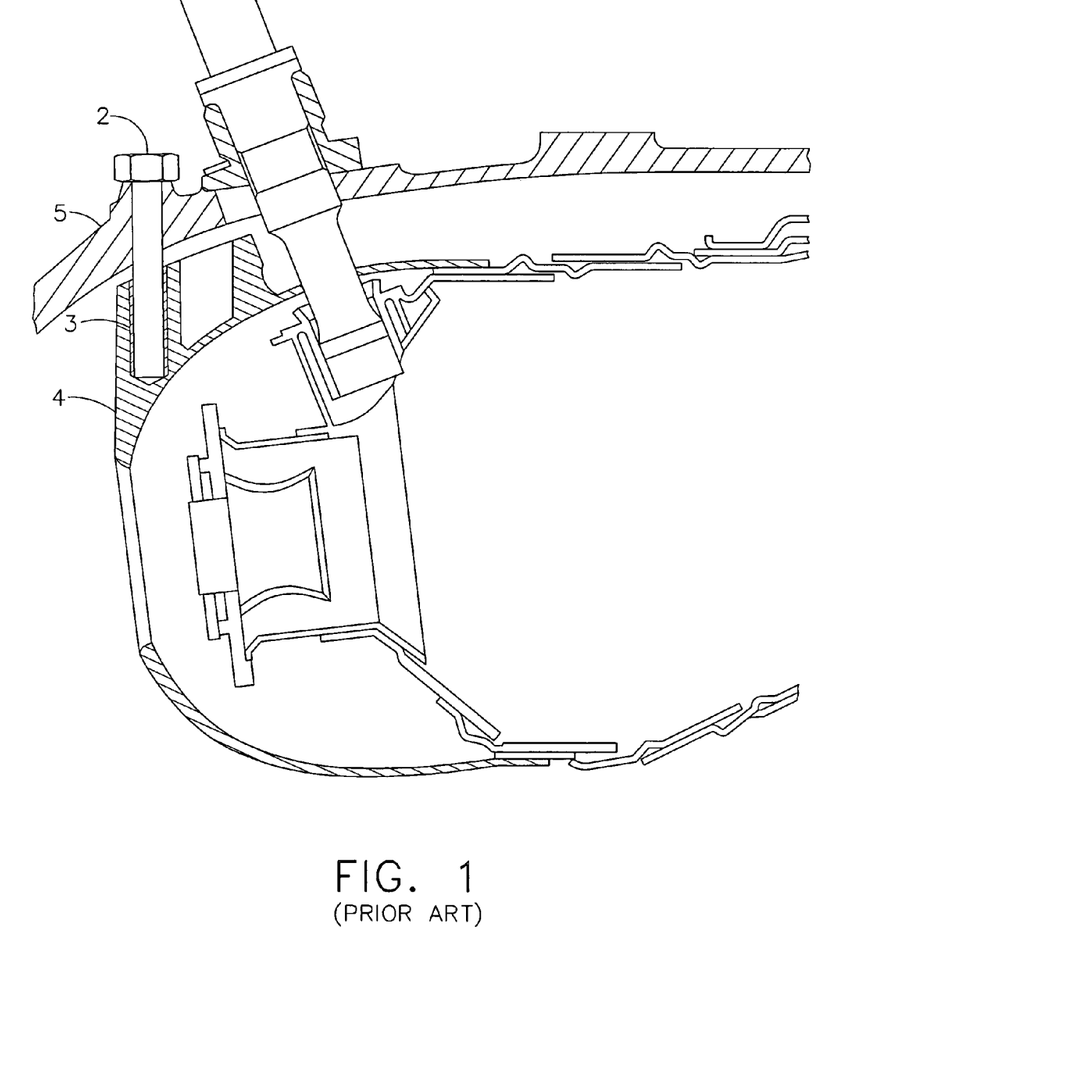
FIG. 1 is a cross-sectional view of a prior art radial pin.

For example, as shown in FIG. 1, at least one known gas turbine engine includes a combustor casing that includes a plurality of radially oriented pins 2 that engage female bushings 3 that are coupled to the combustor 4. The pins are threaded into the combustor outer casing 5, which surrounds the combustor. In operation, the combustor, which is considerably hotter than the casing, is free to expand in a radial direction.

However, as shown in FIG. 1, to assemble the combustor within the gas turbine engine, the dimensional tolerances of the components require a radial clearance in the fit of the male pin to the female bushing to permit assembly. As a result, during operation, only a portion of the radial pins support the axial load and react to tangential forces. As such, these radial pins may experience increased wear compared to other radial pins utilized to support the combustor. In addition, slight dimensional misalignment of either the pins, the bushing bores, or both, may cause the load to be concentrated on either the edge of the bushing and/or the end of the pin. This concentrated load on what is initially a point of contact on the pin and/or bushing again may result in increased wear of the bushing and/or the pin.

BRIEF DESCRIPTION OF THE INVENTION

In one aspect, a method for assembling a gas turbine engine is provided. The method includes coupling an axisymmetric structure within the gas turbine engine, wherein the axisymmetric structure includes a plurality of mounting bushings extending from a radially outer surface of the axisymmetric structure, inserting a first quantity of fixed pins at least partially into a respective mounting bushing to facilitate securing the axisymmetric structure within the gas turbine engine, and inserting a second quantity of floating pins at least partially into a respective mounting bushing to facilitate each floating pin moving in both an axial and tangential direction with respect to a gas turbine engine centerline axis.

In a further aspect, a gas turbine engine is provided. The gas turbine engine includes an axisymmetric structure within the gas turbine engine, wherein the axisymmetric structure includes a plurality of mounting bushings extending from a radially outer surface of the axisymmetric structure, a first quantity of fixed pins inserted at least partially into a respective mounting bushing to facilitate securing the axisymmetric structure within the gas turbine engine, and a second quantity of floating pins inserted at least partially into a respective mounting bushing such that each floating pin is movable in both an axial and tangential direction with respect to a gas turbine engine centerline axis.

DETAILED DESCRIPTION OF THE INVENTION

Figure 2:
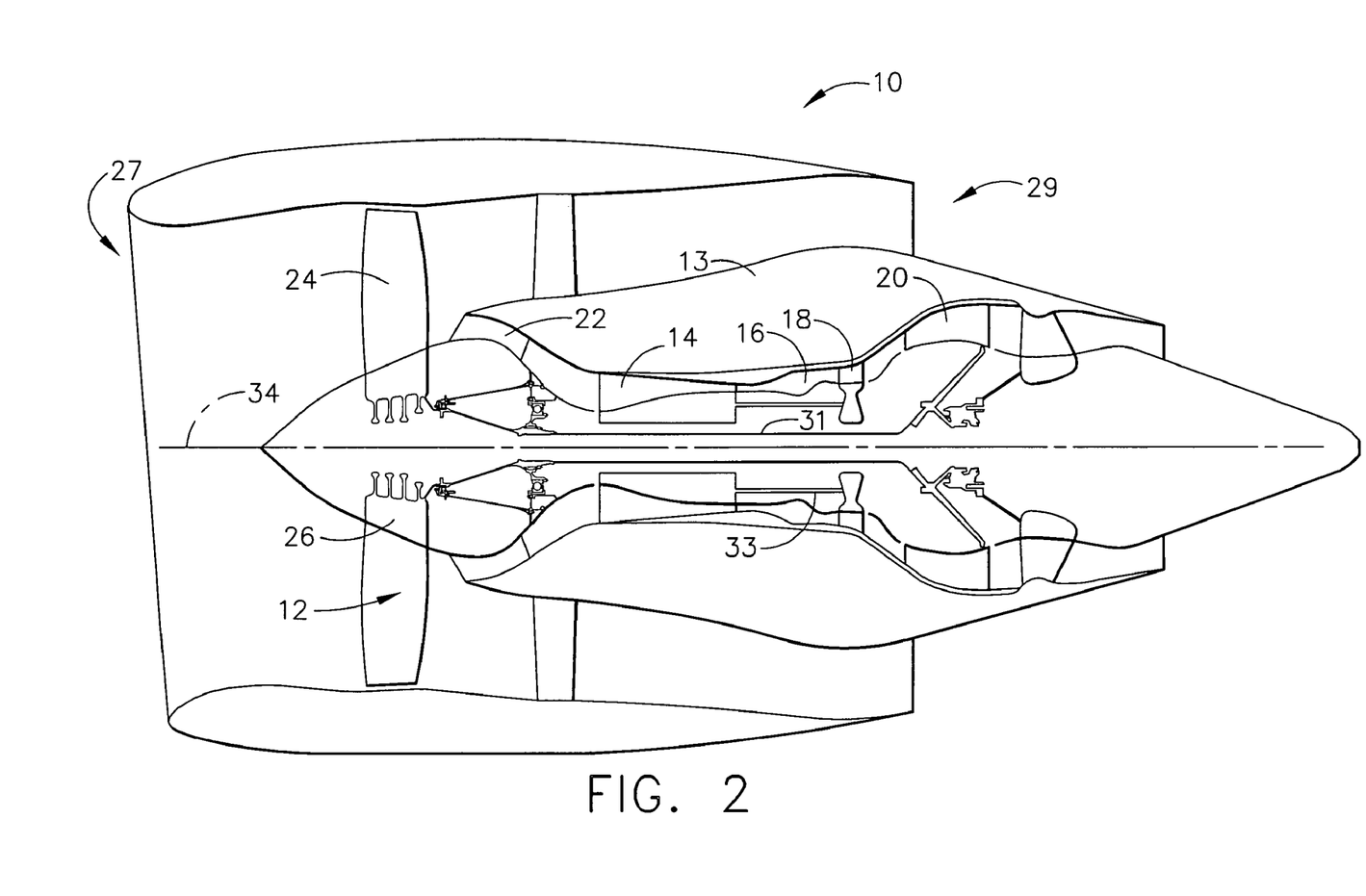
FIG. 2 is a schematic view of an exemplary gas turbine engine.

FIG. 2 is a schematic illustration of a gas turbine engine assembly 10 including a fan assembly 12 and a core engine 13 including a high pressure compressor 14, a combustor 16, and a high pressure turbine 18. In the exemplary embodiment, gas turbine engine assembly 10 also includes a low pressure turbine 20 and a booster 22. Fan assembly 12 includes an array of fan blades 24 extending radially outward from a rotor disc 26. Gas turbine engine assembly 10 has an intake side 27 and an exhaust side 29. In one embodiment, the gas turbine engine is a CF6-50 available from General Electric Company, Cincinnati, Ohio. Fan assembly 12, turbine 20, and booster 22 are coupled together by a first rotor shaft 31, and compressor 14 and turbine 18 are coupled together by a second rotor shaft 33.

During operation, air flows axially through fan assembly 12, in a direction that is substantially parallel to a central axis 34 extending through engine 10, and compressed air is supplied to high pressure compressor 14. The highly compressed air is delivered to combustor 16. Airflow (not shown in FIG. 2) from combustor 16 drives turbines 18 and 20, and turbine 20 drives fan assembly 12 by way of shaft 31.

Figure 3:
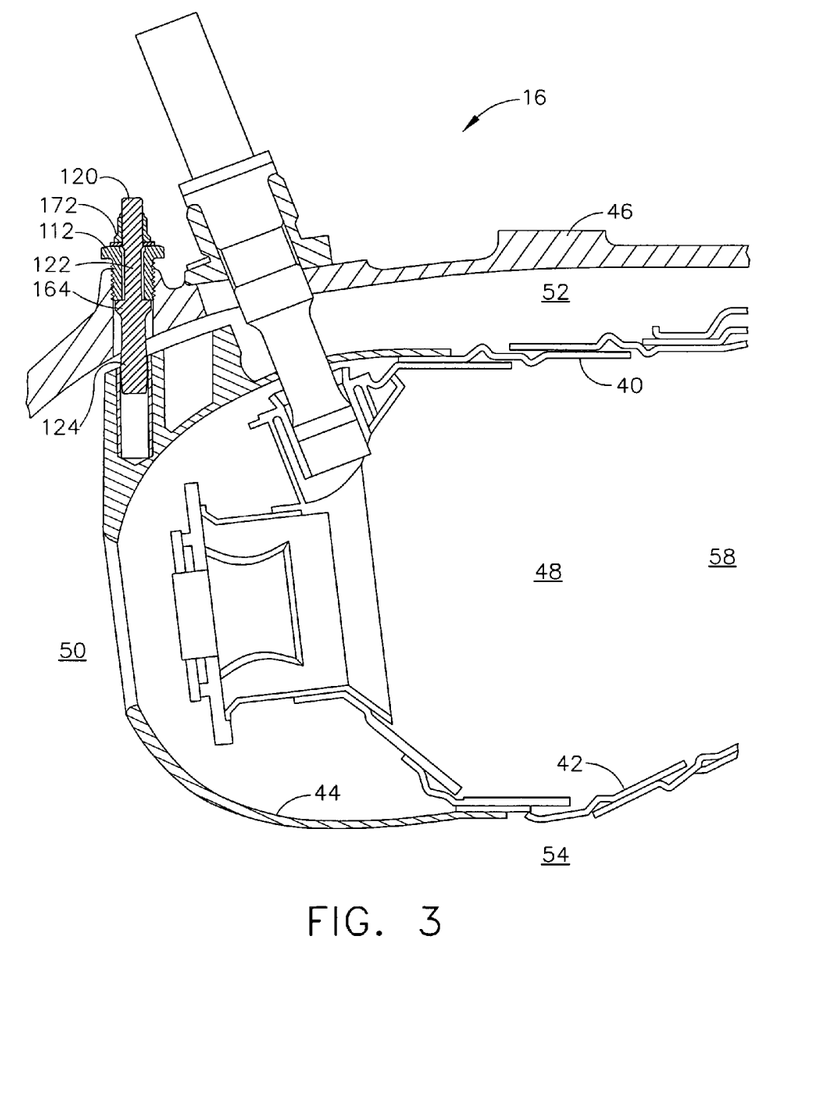
FIG. 3 is a cross-sectional view of a portion of the gas turbine engine shown in FIG. 1.

FIG. 3 is a cross-sectional view of combustor 16 shown in FIG. 2. In the exemplary embodiment, combustor 16 includes an annular outer liner 40, an annular inner liner 42, and a combustor dome assembly 44 extending between outer and inner liners 40 and 42, respectively.

Outer liner 40 and inner liner 42 are spaced radially inward from a combustor casing 46 and define a combustion chamber 48. Combustor casing 46 is generally annular and extends downstream from an exit 50 of a compressor, such as compressor 14 shown in FIG. 1. Outer liner 40 and combustor casing 46 define an outer passageway 52 and inner liner 42 and an inner support structure (not shown) define an inner passageway 54. Outer and inner liners 40 and 42, respectively, extend to a turbine inlet nozzle 58 disposed downstream from combustion chamber 48.

In the exemplary embodiment, combustor dome assembly 44 is arranged in a single annular configuration. In another embodiment, combustor dome assembly 44 is arranged in a double annular configuration. In a further embodiment, combustor dome assembly 44 is arranged in a triple annular configuration. In the exemplary embodiment, combustor dome assembly 44 provides structural support to an upstream end of combustor 16. More specifically, gas turbine engine assembly 10 includes an attachment assembly to facilitate securing combustor 16 within core gas turbine engine 13 utilizing combustor dome assembly 44.

Figure 4:
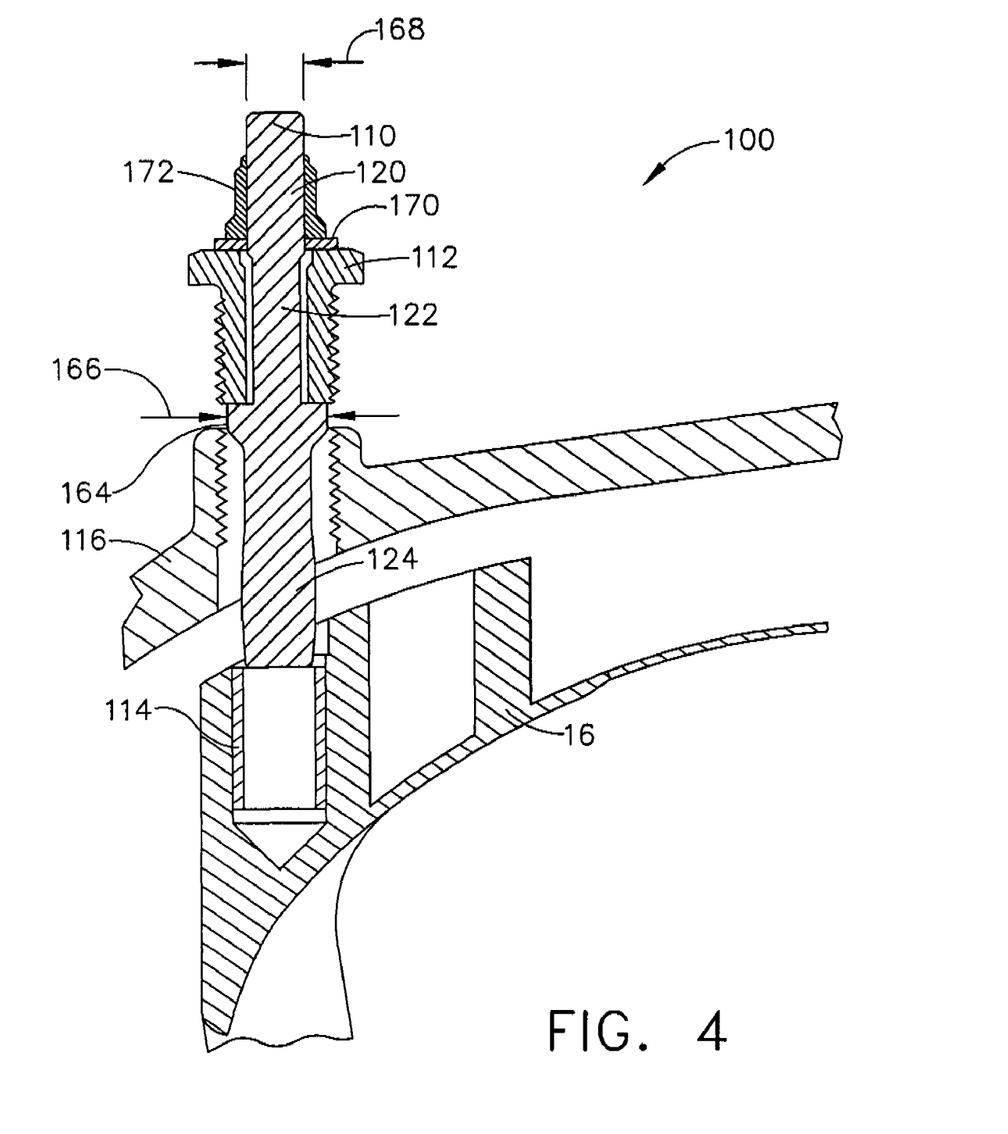
FIG. 4 is a cross-sectional view of an exemplary attachment assembly, during initial assembly, that may be utilized with the gas turbine engine shown in FIG. 1.
Figure 5:
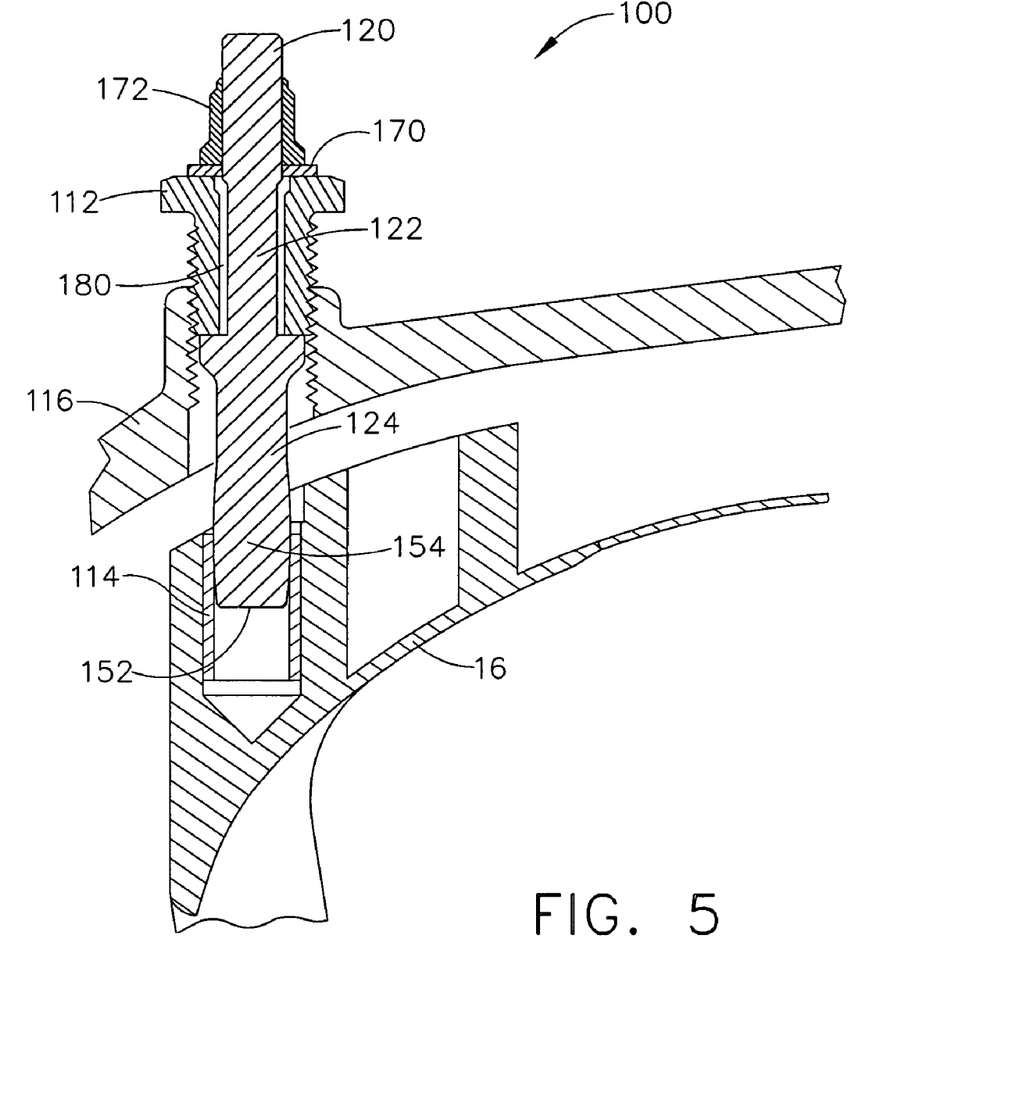
FIG. 5 is a cross-sectional view of the attachment assembly shown in FIG. 4 during final assembly.
Figure 6:
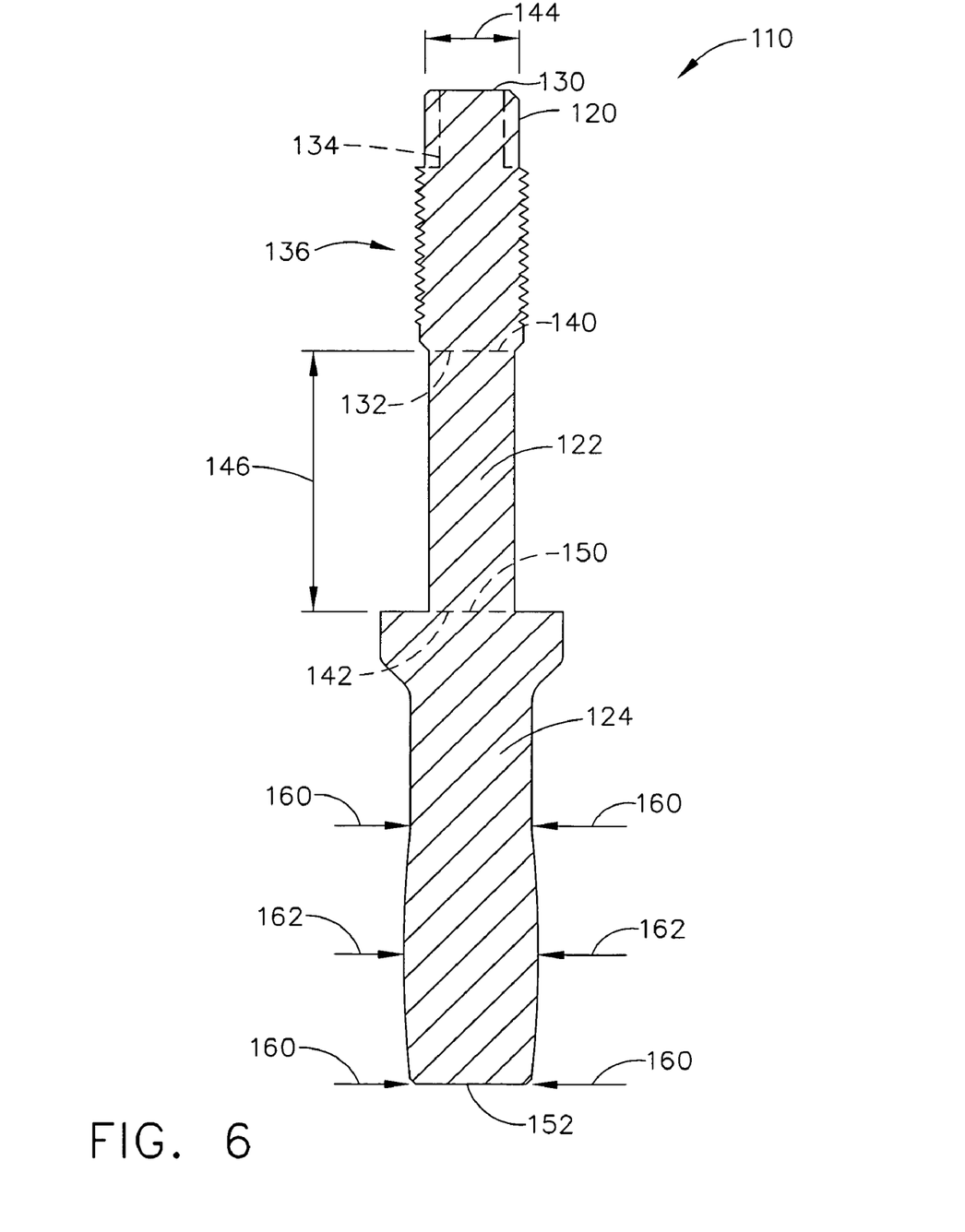
FIG. 6 is a cross-sectional view of a portion of the attachment assembly shown in FIGS. 4 and 5.

FIG. 4 is an exemplary attachment assembly 100, shown during initial assembly, that may be utilized to secure an axisymmetric structure, such as combustor 16 within a gas turbine engine, such as gas turbine engine 10. FIG. 5 is a second view of attachment assembly 100 during final assembly. FIG. 6 is a cross-sectional view of the alignment pin shown in FIGS. 4 and 5. Although, the attachment assemblies are described herein with respect to exemplary gas turbine engine 10, it should be realized that the attachment assemblies may be utilized to install and/or align an axisymmetric structure in a wide variety of gas turbine engines.

In the exemplary embodiment, attachment assembly 100 includes a plurality of radially oriented alignment pins 110 that are each inserted through a respective threaded bushing 112 to engage a respective female bushing 114 that is coupled to combustor 16. During assembly, the alignment pins 110 are threaded into the combustor outer casing 116, which surrounds combustor 16.

More specifically, each alignment pin 110 includes a first portion 120, a second portion 122, and a third portion 124. In the exemplary embodiment, portions 120, 122 and 124 are formed as a unitary alignment pin 110. First portion 120 has a first end 130 that is utilized by an operator to hold alignment pin 110 during engine assembly and a second end 132 that is coupled to second portion 122. First end 130 has a shape that is configured to allow an operator to hold the end, for example, first end 130 may have at least two flat surfaces 134 to allow an operator to utilize a wrench to hold alignment pin 110. First portion 120 also includes a plurality of threads 136 that are sized to receive a retaining apparatus discussed further herein.

Second portion 122 includes a first end 140 that is coupled to first portion second end 132 and a second end 142 that is coupled to third portion 124. Second portion 122 has a diameter 144 that is sized such that second portion 122 may be inserted through retaining bushing 112 described further herein. Moreover, second portion 122 has a length 146 that is sized to enable first portion 120 and third portion 124 to extend outwardly from bushing 112 as shown in FIGS. 4 and 5.

Third portion 124 includes a first end 150 that is coupled to second portion second end 142 and a second end 152 that is at least partially inserted into bushing 114. Third portion 124 includes a crowned portion 154 that is coupled proximate to second end 152. In the exemplary embodiment, crowned portion 154 is formed unitarily with third portion 124 and thus also formed unitarily with first and second portions 122 and 124, respectively. Crowned portion 154 extends from third portion second end 152 at least partially toward third portion first end 150. More specifically, crowned portion 154 has a first diameter 160 at second end 152. Crowned portion 154 then gradually tapers outwardly in the direction of first end 150 to an apex wherein crowned portion 154 has a second diameter 162 that is greater than the first diameter 160. Crowned portion 154 then gradually tapers inwardly in the direction of first end 150 until the diameter of the crowned portion is approximately equal to the diameter of second end 152, i.e. diameter 160.

In the exemplary embodiment, crowned portion 154, i.e. the crowned surface of pin 110 which engages bushing 114 facilitates allowing misalignment of the pin centerline with the axis of the bushing diameter while maintaining a line contact, rather than a point contact as in the prior art, thus providing a superior wear surface. Moreover, the crowned portion 154, defined by a relatively large, two inches or greater partial radius, is such that, when a very small amount of radial pin wear occurs, the line contact becomes contact over a relatively large area. This large area then serves to reduce the contact stress level resulting from the axial/tangential combustor loads and therefore serves to further retard wear and improve durability.

Third portion 124 also includes a platform or shoulder 164 that is coupled proximate to third portion first end 150. In the exemplary embodiment, the shoulder 164 has a diameter 166 that is greater than an inner diameter 168 of bushing 112.

Attachment assembly 100 also includes a washer 170 that is sized to circumscribe at least a portion of alignment pin 110 and a retaining nut 172 that is threadably coupled to first portion 120 to facilitate securing alignment pin 110 to bushing 112.

During assembly, alignment pin 110 third portion 124 is inserted through an opening in combustor outer casing 116 and is at least partially inserted into bushing 114 such that at least a portion of crowned portion 154 is in contact with bushing 114. More specifically, the crowned portion 154 of alignment pin 110 is now a relatively close diametrical fit to bushing 114. Accordingly, the combustor bushing 114 positional tolerance is accommodated by the axial and tangential clearance that is provided by a space 180 that is defined between the alignment pin 110 and the bushing 112, i.e. the alignment pin "floats" within bushing 112. During assembly, the clearance 180 allows the pin 110 to engage the combustor bushing 114 and thus "finds a home" in the tangential and axial directions relative to the casing. The retaining bushing 112 is then installed which secures the alignment pin in a radial direction with respect to the combustor. The washer 170 and retaining nut 172 are then coupled to the alignment pin 110 to secure the alignment pin 110 in this axial/tangential position.

As a result, the pin/bushing clearance necessary in the prior art design is eliminated, wear capability and durability are improved for any axisymmetric structure pin-mounted connection because all of the pins will share the applied axial and tangential loads, rather than as few as two or three pins sharing the applied axial and tangential loads as shown in the prior art. Moreover, the crowned pin interface surface represents an additional improvement in wear capability.

Figure 7:
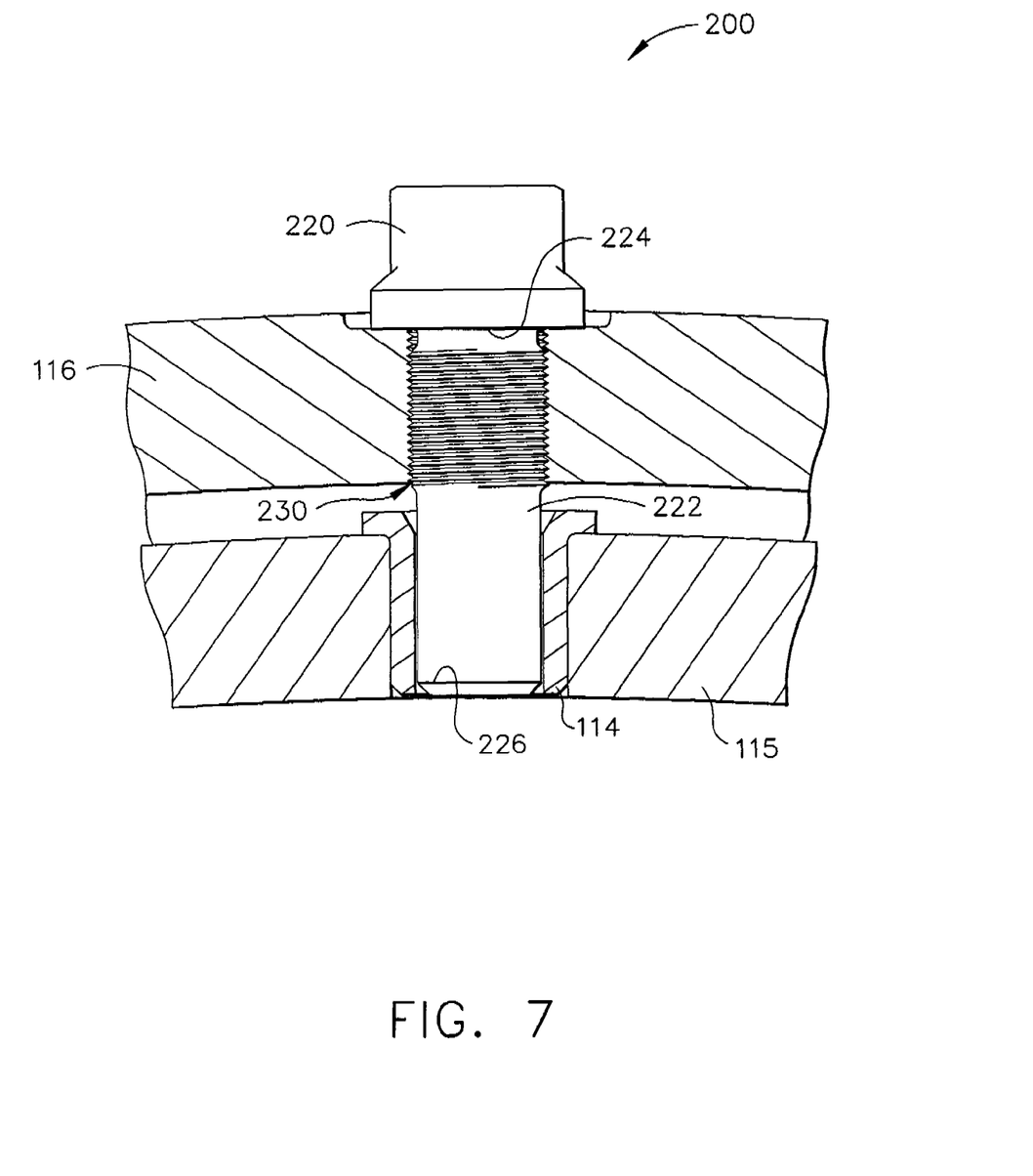
FIG. 7 is a cross-sectional view of an exemplary fixed pin that may be utilized with the gas turbine engine shown in FIG. 1.

FIG. 7 is a cross-sectional view of a fixed alignment pin 200 that can be utilized with attachment assembly 100 to facilitate securing an axisymmetric structure, such as combustor 16 for example, within a gas turbine engine. In the exemplary embodiment, fixed pin 200 has a substantially T-shaped cross-sectional profile and includes such that at least a portion of fixed pin 200 is at least partially inserted into a respective female bushing 114 that is at least partially inserted into a dome boss 115.

More specifically, each fixed pin 200 has a substantially T-shaped cross-sectional profile and includes a head portion 220 that is utilized to secure fixed pin 200 within bushing 114, a threaded shaft portion 222 having a first end 224 that is coupled to head portion 220 and a second end 226 that is at least partially inserted into bushing 114.

Figure 8:
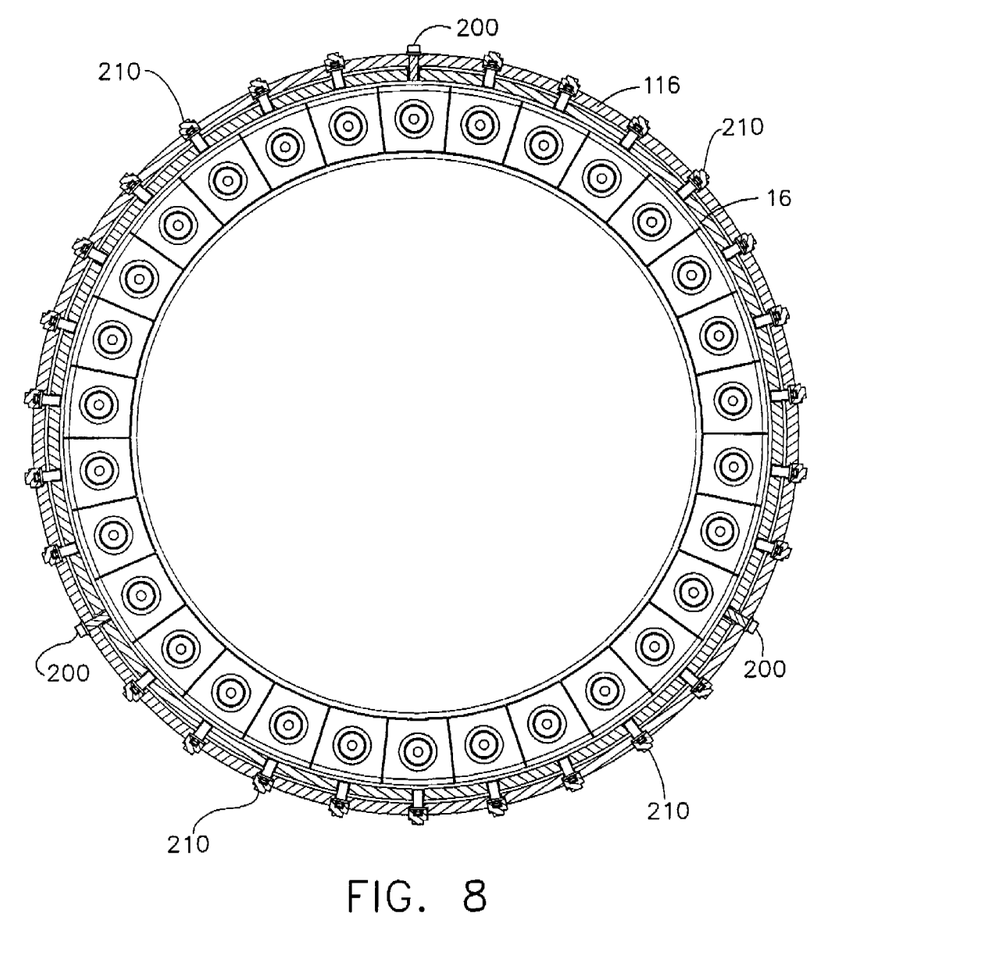
FIG. 8 is an end view of an exemplary combustor that includes a plurality of floating pins and a plurality of fixed pins.

More specifically, and referring to FIG. 8, during assembly an axisymmetric structure such as combustor 16 for example is positioned within the gas turbine engine. To facilitate aligning and or securing combustor 16 within the gas turbine engine, each fixed pin 200 is threaded into an opening 230 that is defined through a combustor outer casing 116, which surrounds combustor 16 such that second end 226 is substantially secured into bushing 114. In the exemplary embodiment, a first quantity of floating pins 210 and a second quantity of fixed pins 200 are utilized to align combustor 16 within the gas turbine engine. For example in one embodiment, three fixed pins 200 are each threaded into a respective opening 230 such that each second end 226 is substantially secured into a respective bushing 114. More specifically, as shown in FIG. 8, the three fixed pins 200 are each positioned approximately 120 degrees from each adjacent fixed pin 200 to facilitate securing combustor 16 in a substantially fixed position during assembly. The remainder of openings 230 are then utilized to install the floating pins 210 which are then torqued and/or tightened to facilitate the combustor moving in both an axial and tangential direction with respect to a gas turbine engine centerline axis.

Moreover, although the exemplary embodiment describes utilizing three fixed pins 200 to secure the combustor during engine assembly, it should be realized that optionally two fixed pins 200 separated by 180 degrees may also be utilized. Further four pins separated by 90 degrees may also be utilized.

As a result, the pin/bushing clearance necessary in the prior art design is eliminated, wear capability and durability are improved for any axisymmetric structure pin-mounted connection because all of the pins will share the applied axial and tangential loads, rather than as few as two or three pins sharing the applied axial and tangential loads as shown in the prior art. Moreover, the crowned pin interface surface of each floating pin represents an additional improvement in wear capability.

The above-described support arrangement for hardware positioned on the interior of a segmented flow path provides a cost-effective and reliable means for aligning gas turbine interior support hardware with respect to the segmented flowpath components. More specifically, the invention described herein includes a hybrid or combined arrangement wherein the positioning or setting of the proper orientation of the combustor into the engine case or support structure is provided by a minority of the total number of pins (e.g. 2 or 3) being the "fixed" variety, with the remainder of the "floating" style pins installed and torqued or tightened to facilitate uniform loading due to the reduced diametral insert to pin clearance the floating pin concept provides.

As a result, the invention described herein facilitates accurately locating the combustor relative to the engine (axially and tangentially), since the floating-pin design inherently has capability to allow for the combustor to move axially or tangentially prior to the floating pins being secured using at least one of a set plug/screw or cover clamp/bolt. Moreover, the invention described herein facilitates reducing pin wear compared to known concepts which utilize only fixed style pins to mount the combustor within the gas turbine, as a result the floating style pins allow more uniform insert and pin contact, and thus reduce wear by using the balance of the floating-pin design to be assembled and locked-in place after the initial alignment is provided by the fixed pins.

Exemplary embodiments of gas turbine engine axisymmetric structure alignment assemblies are described above in detail. The alignment assemblies illustrated are not limited to the specific embodiments described herein, but rather, components of each alignment assembly may be utilized independently and separately from other components described herein. For example, although a combustor is described herein, the alignment assemblies may also be used to align a variety of interior structure hardware to hardware other than a combustor.

While the invention has been described in terms of various specific embodiments, those skilled in the art will recognize that the invention may be practiced with modification within the spirit and scope of the claims.

What is claimed is:

1. A method for assembling a gas turbine engine, said method comprising:
    coupling an axisymmetric structure within the gas turbine engine, wherein the axisymmetric structure includes a plurality of mounting bushings extending from a radially outer surface of the axisymmetric structure;
    inserting a first quantity of fixed pins at least partially into a respective mounting bushing to facilitate securing the axisymmetric structure within the gas turbine engine; and
    inserting a second quantity of floating pins that is greater than the first quantity of fixed pins at least partially into a respective mounting bushing to facilitate each floating pin moving in both an axial and tangential direction with respect to a gas turbine engine centerline axis.

2. A method in accordance with claim 1 wherein the floating pins each include a crowned surface, said method further comprising inserting the floating pins at least partially into a respective mounting bushing such that each floating pin provides both axial and tangential support to the axisymmetric structure.

3. A method in accordance with claim 1 wherein the axisymmetric structure includes a combustor, said method further comprising inserting a floating pin having a crowned surface at least partially into the combustor mounting bushing such that the floating pin provides both axial and tangential support to the combustor.

4. A method in accordance with claim 3 further comprising securing each floating pin to the combustor using a threaded fastener.

5. A method in accordance with claim 4 wherein each floating pin includes a shoulder, said method further comprising securing each floating pin to a combustor outer liner such that the threaded fastener secures the shoulder against a threaded bushing.

6. A method in accordance with claim 5 wherein a portion of each floating pin has a first diameter and the threaded bushing has a second diameter that is greater than the first diameter, said method further comprising inserting the floating pin through the threaded bushing such that the floating pin is configured to move in both an axial and tangential direction with respect to a gas turbine engine centerline axis.

7. A method in accordance with claim 3 wherein each floating pin includes a head portion, said method further comprising:
    securing the floating pin to a combustor outer casing such that the head portion is at least partially inserted into a threaded bushing; and
    securing the floating pin to the threaded bushing utilizing a threaded plug such that the head portion is movable in both an axial and tangential direction with respect to a gas turbine engine centerline axis inside the threaded bushing.

8. A method in accordance with claim 1 further comprising inserting a first quantity of fixed pins at least partially into a respective mounting bushing, wherein each fixed pin is separated by approximately 120 degrees from a respective fixed pin.

9. A method in accordance with claim 1 further comprising inserting a first quantity of fixed pins at least partially into a respective mounting bushing, wherein each fixed pin is separated by approximately 180 degrees from a respective fixed pin.

10. A gas turbine engine comprising:
an axisymmetric structure within the gas turbine engine, wherein the axisymmetric structure includes a plurality of mounting bushings extending from a radially outer surface of the axisymmetric structure;
a first quantity of fixed pins inserted at least partially into a respective mounting bushing to facilitate securing the axisymmetric structure within the gas turbine engine; and
a second quantity of floating pins that is greater than said first quantity of fixed pins inserted at least partially into a respective mounting bushing such that each said floating pin is movable in both an axial and tangential direction with respect to a gas turbine engine centerline axis.

11. A gas turbine engine in accordance with claim 10 wherein each said floating pin comprises a crowned surface that is inserted at least partially into a respective mounting bushing such that each said floating pin provides both axial and tangential support to the axisymmetric structure.

12. A gas turbine engine in accordance with claim 10 wherein said axisymmetric structure comprises a combustor, each said floating pin comprising a crowned surface that is at least partially inserted into a respective combustor mounting bushing such that each said floating pin provides both axial and tangential support to the combustor.

13. A gas turbine engine in accordance with claim 12 further comprising a threaded fastener utilized to secure each said floating pin to said combustor.

14. A gas turbine engine in accordance with claim 13 wherein each said floating pin comprises a shoulder, each said floating pin secured to a combustor outer liner such that said threaded fastener secures said shoulder against a threaded bushing.

15. A gas turbine engine in accordance with claim 14 wherein a portion of each said floating pin has a first diameter and said threaded bushing has a second diameter that is greater than the first diameter.

16. A gas turbine engine in accordance with claim 12 wherein each said floating pin comprises a head portion that is at least partially inserted into a threaded bushing; each said floating pin secured to said threaded bushing utilizing a threaded plug such that said head portion is movable in both an axial and tangential direction with respect to a gas turbine engine centerline axis inside said threaded bushing.

17. A gas turbine engine in accordance with claim 10 wherein each said fixed pin is separated by approximately 120 degrees from an adjacent fixed pin.

18. A gas turbine engine in accordance with claim 10 wherein each said fixed pin is separated by approximately 180 degrees from an adjacent fixed pin.

* * * * *